June 10, 1941.  H. W. SIMPSON  2,245,451
MOWER STRUCTURE
Original Filed Jan. 22, 1940  4 Sheets-Sheet 1
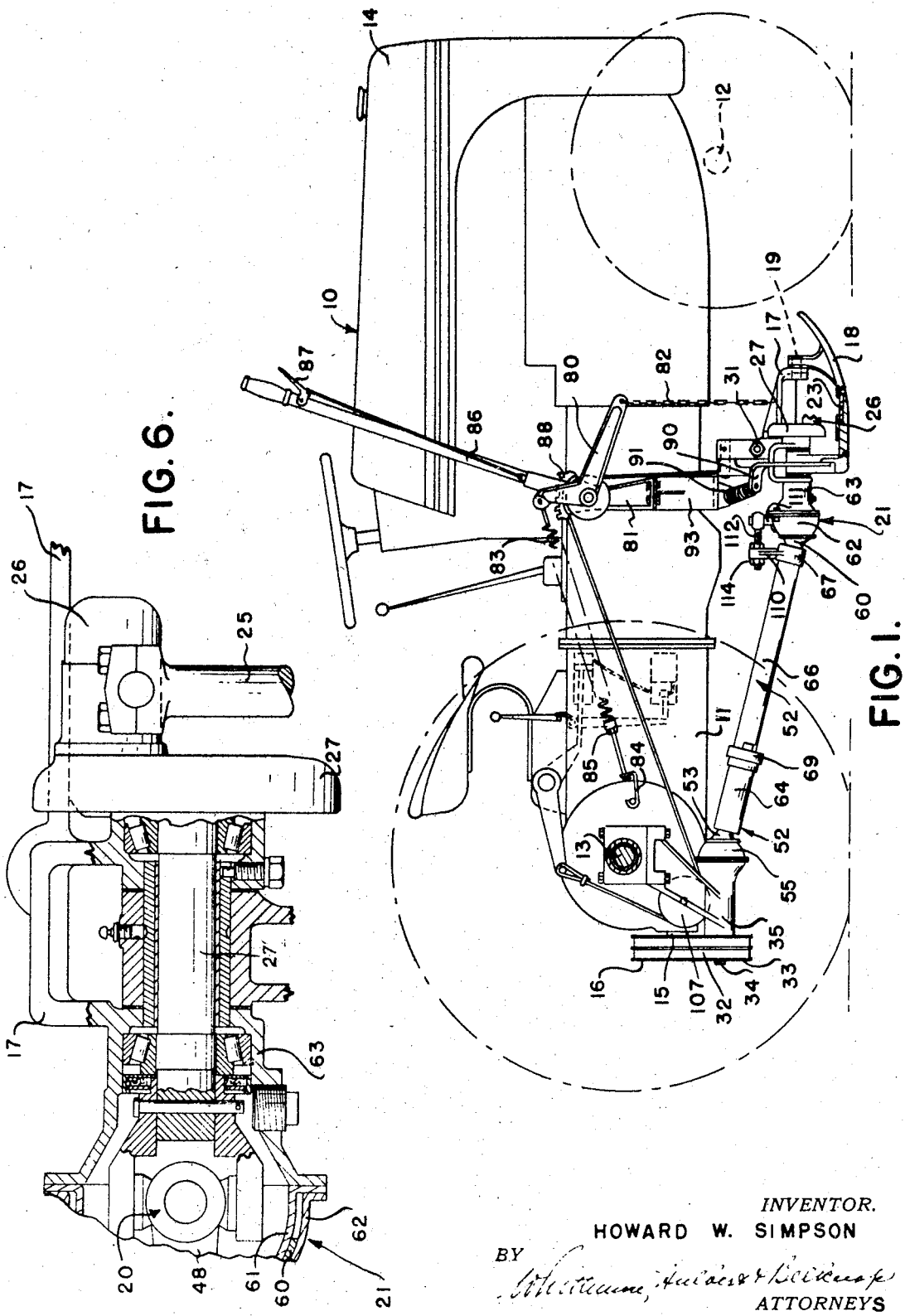
INVENTOR.
HOWARD W. SIMPSON
BY
ATTORNEYS

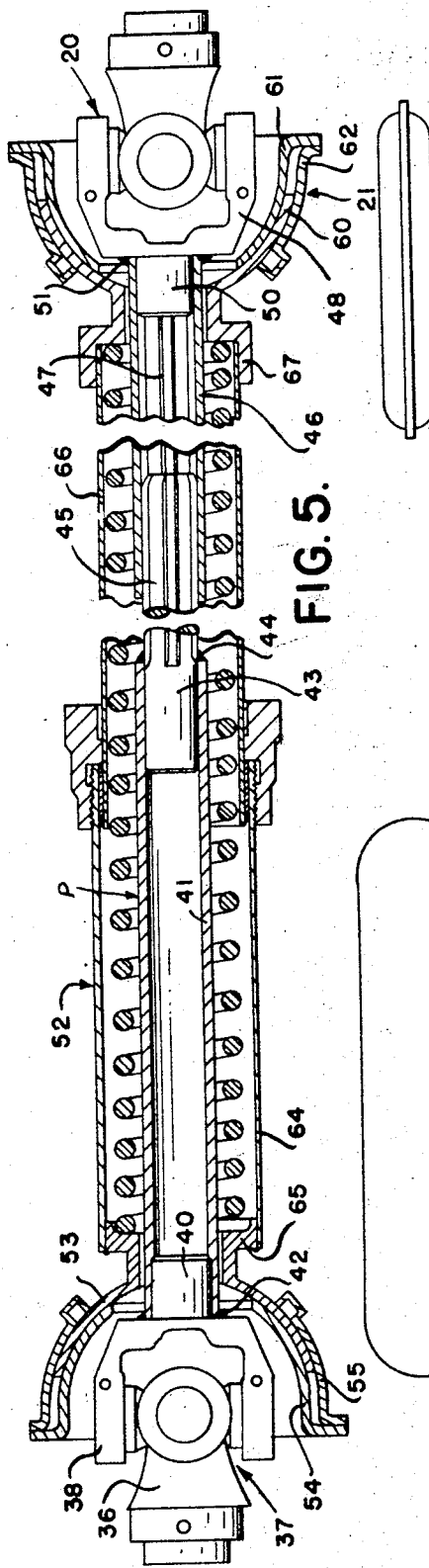
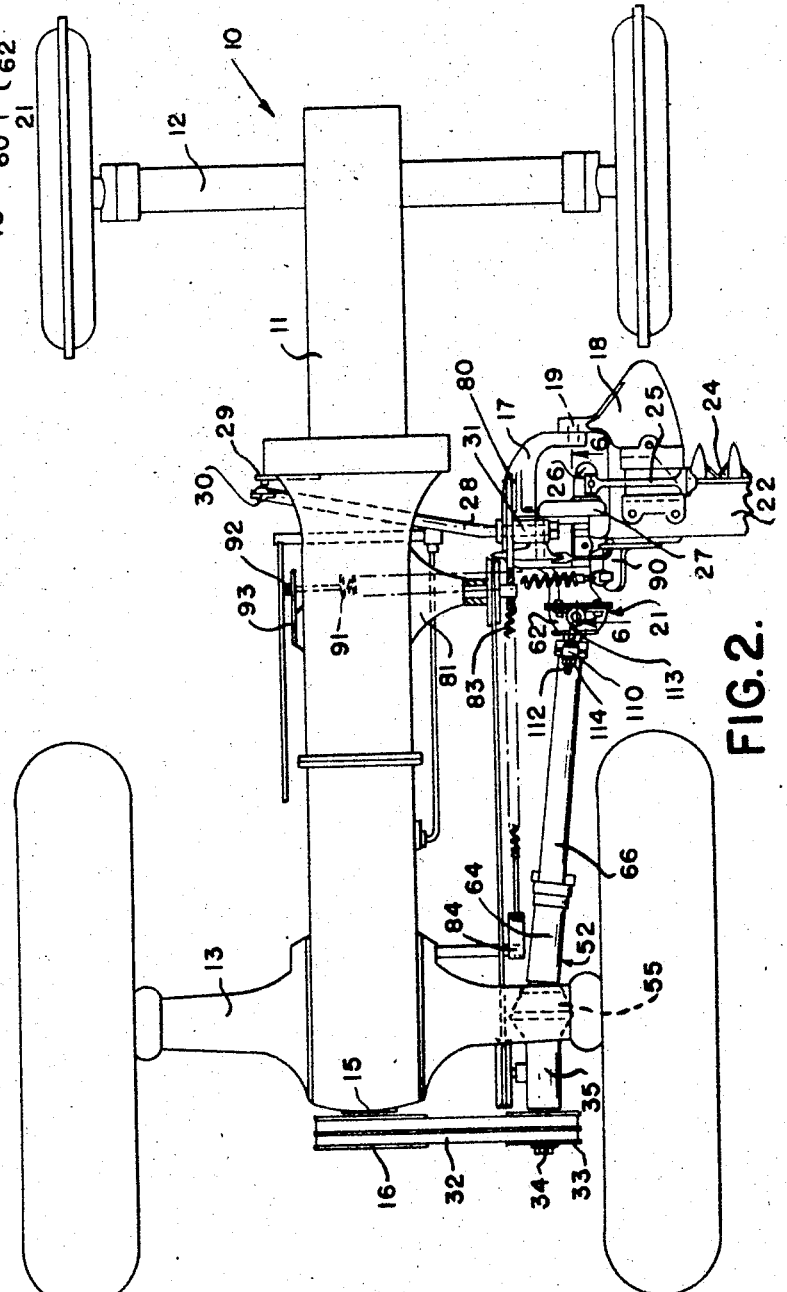

June 10, 1941.     H. W. SIMPSON     2,245,451
MOWER STRUCTURE
Original Filed Jan. 22, 1940     4 Sheets-Sheet 3

INVENTOR.
HOWARD W. SIMPSON
BY
ATTORNEYS

Patented June 10, 1941

2,245,451

UNITED STATES PATENT OFFICE 2,245,451

MOWER STRUCTURE

Howard W. Simpson, Dearborn, Mich., assignor to Detroit Harvester Company, Detroit, Mich., a corporation of Michigan Original application January 22, 1940, Serial No. 315,112. Divided and this application May 20, 1940, Serial No. 336,285

19 Claims. (Cl. 56—25)

This invention relates generally to mower structures such as tractor operated mowers, and constitutes a division of my application filed January 22, 1940, bearing Serial No. 315,112.

One of the essential objects of the invention is to provide a mower bar support that is adjustable about a transverse horizontal axis, preferably about a connection between said support and the tractor, so that the sickle bar carried by said mower bar may be tilted relative to the ground to vary the height of cut.

Another object is to provide an efficient means for adjusting the mower bar support about the transverse axis mentioned.

Other objects, advantages and novel details of construction of this invention will be made more apparent as this description proceeds, especially when considered in connection with the accompanying drawings, wherein:

Figure 1 is a side elevation of my combined tractor-mower with parts broken away for clearness;

Figure 2 is a top plan view of my improved tractor-mower combination with parts broken away for clearness;

Figure 5 is a longitudinal section of the torque transmitting shaft and the housing therefor;

Figure 6 is a section taken on the plane indicated by the line 6—6 of Figure 2;

Figure 3:
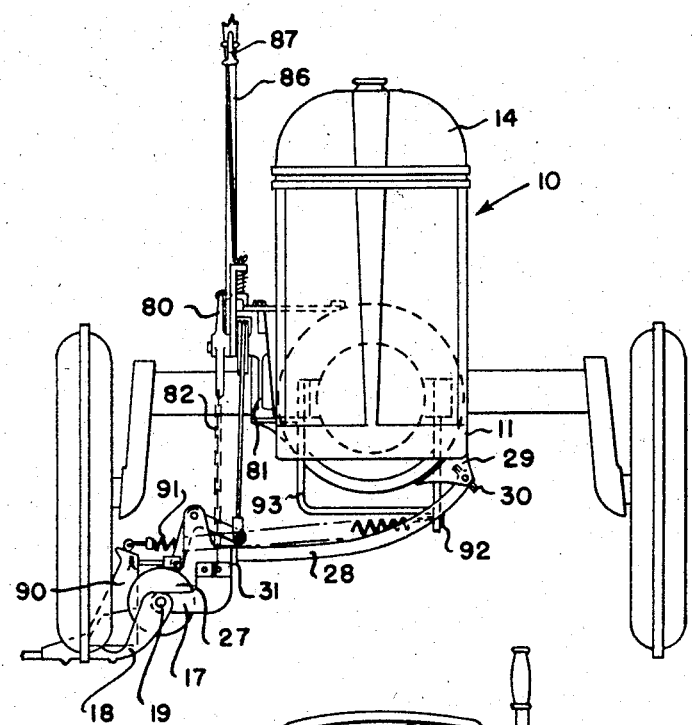
Figure 3 is a front elevation of my improved tractor-mower.

Referring now to the drawings, 10 is a tractor having a main frame 11 provided with a front axle 12 and a rear axle 13. A suitable motor (not shown) is provided within a hood 14 on the frame and is adapted to drive the tractor forwardly and rearwardly through suitable transmission means including a conventional clutch. The motor is also adapted to drive a suitable power take-off, including a shaft 15 and sheave 16.

The mower mechanism comprises a support 17 to which is secured an inner shoe 18. The shoe 18 is pivoted to the support for vertical swinging movement about an axis defined by the pivot connection indicated at 19 in Figure 2 and the center of a universal joint 20 within a universally adjustable housing 21.

Rigidly secured to the shoe 18 is a mower arm 22 on which is mounted for longitudinal reciprocation a sickle bar 23 carrying cutting sectors 24. The sickle bar 23 is connected by a pitman 25 with a crank pin 26 carried by a crank 27 of a crank shaft 27' driven from the power take-off in a manner which will subsequently be described.

The support 17 is connected to the frame 11 of the tractor by a bar 28 which is secured to the frame of the tractor by a bracket 29 and a universal connection 30. Accordingly, the bar 28 limits movement of the support 17 about the center of the universal joint 30. The connection between the bar 28 and the support 17, as indicated at 31 in Figure 3, permits adjustment of the support 17 about a transverse horizontal axis, as will subsequently be described.

The power take-off shaft 15, previously referred to, is connected by a plurality of V-belts or other suitable drive means 32 to a plurality of sheaves 33 mounted on a transmission shaft 34. The shaft 34 is mounted in a housing 35 rigidly secured as by bolting or otherwise to the rear axle 13 of the tractor, all as best seen in Figure 1. Intermediate the transmission shaft 34 and the crank shaft 27' and connected thereto by universal joints 37 and 20, respectively, is a telescoping propeller shaft P. As shown, the shaft 34 carries at one end thereof one element 36 of a torque transmitting universal joint 37, the other element 38 being connected to the torque transmitting shaft which transmits the power to the crank 27. As best seen in Figure 5, the element 38 of the universal joint has a stub section 40 which is received within a torque transmitting tubular member 41 rigidly secured thereto as by welding or the like, as indicated at 42. The tubular member 41, at its opposite end, carries a shaft 43 rigidly secured thereto as indicated by the welded connection 44. Shaft 43 is splined as indicated at 45, and is received within a second tubular shaft 46 correspondingly splined, as indicated at 47, which is permanently secured to one element 48 of the universal joint 20 previously referred to. The connection between the tubular shaft 46 and the element 48 of the universal joint is indicated as comprising a short section 50 received within tubular shaft 46 and as including a welded connection 51. It will be evident that a torque will be transmitted from the single element 38 to the universal joint element 48 through the medium of the tubular member 41, shaft 43, and tubular shaft 46. At the same time the parts are telescopically arranged, the tubular shaft 46 being adapted to slide longitudinally over the splined shaft 45.

In order to protect the torque transmitting telescopic shafts just described, the tubular housing indicated generally at 52 is provided. This comprises a spherically formed cap 53 cooperating in universally adjusted relation with a spherically formed inner shell 54 and a spherically formed outer shell 55. Shells 54 and 55, as indicated in Figure 1, are secured to the shaft housing 35, and cooperate therewith to form a complete housing for the universal joint 37. At the opposite end of the torque transmitting assembly is a spherically formed shell 60 cooperating in universally adjusted relation with a spherically formed inner shell 61 and an outer shell 62. Shells 61 and 62, as best indicated in Figure 1, are rigidly secured to a crank shaft housing 63 with which they form the housing 21 for the universal joint 20. Housing 63 is in turn rigid with the support 17.

Intermediate the spherically formed shells 53 and 60, I provide a tubular member 64 welded or otherwise secured to a flange 65 on shell 53, and a cooperating tubular member 66 welded or otherwise secured within a flange 67 formed on the shell 60.

80 is a bell crank pivoted to a bracket 81 carried by the frame of the tractor. Preferably the bell crank 80 is connected to the support 17 by means of a chain 82, and is urged in a counter-clockwise direction by a spring 83 connected to a bracket 84 secured to the frame 11 of the tractor adjacent the rear axle 13. Suitable means indicated at 85 are provided for adjusting the tension of the spring 83.

Figure 4:
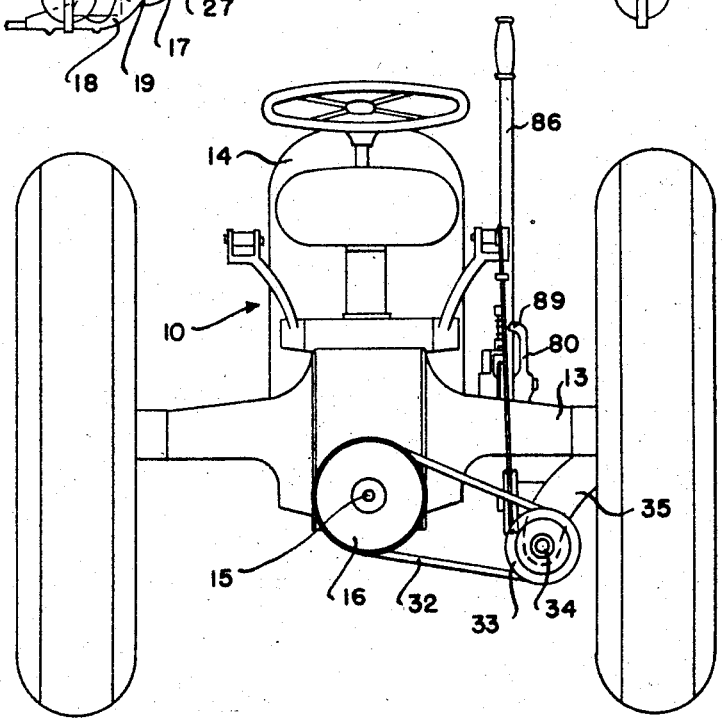
Figure 4 is a rear elevation of my improved tractor-mower.

The bell crank 80 is adapted to apply continuously a lifting force to the support 17, but the force exerted by the spring 83 is less than sufficient to completely counterbalance the weight of the support 17 and its associated structure. Manual means is provided for further actuating the bell crank 80, and this takes the form of a lever 86 having locking means actuated by the release 87 associated with a toothed sector 88. The bell crank 80, as best seen in Figure 4, has an offset portion 89 extending into the path of movement of the lever 86. As a result, movement of the lever 86 rearwardly, as seen in Figure 1, results in positive rotation of the bell crank 80 and positive lifting of the support 17. By this means it is possible to limit the downward position of the support 17. Since the offset portion 89 engages lever 86 at one side only, upward movement of the support 17, due to external causes such as riding over a high point on the ground, is permitted. This upward movement of the support 17 permits bell crank 80 to rotate under the influence of spring 83, thus causing offset portions 89 to move away from lever 86. As soon as the support 17 passes over the high point on the ground, it drops down to its initial position, determined by the setting of lever 86, where offset portion 89 against abuts lever 86.

Referring now particularly to Figure 3, the shoe 18 is provided with a vertically upstanding arm 90, by means of which the shoe and the associated mower arm are adapted to be swung upwardly. Secured to the upper end of the arm 90 is a tension spring 91, the opposite end of which is secured as indicated at 92 to a bracket 93 secured to the frame of the tractor and to which in turn is secured the bracket 81 previously referred to. As best seen in Figure 1, the tension spring 91 exerts a clockwise moment on the shoe 18, and counterbalances a portion of the weight thereof. The spring 91 is selected so that it is insufficient to actually raise the mower arm, but it counterbalances a major portion of the weight thereof and permits the mowing arm to rest lightly on the ground. As a result, springs 91 and 83 together insure that the mowing arm as a whole will rest lightly on the ground, with the spring 83 counterbalancing a large portion of the weight of the assembly at the inner end and exerting a direct lift thereon, and the spring 91 exerts a lifting moment which tends to swing the mowing arm vertically.

As previously stated, the support 17 is adjustable about a transverse horizontal axis and specifically about the connection 31 between said support and the supporting bar 28. In order to provide this adjustment, an arm 110 is provided on the flange 67 of the shell 60, and the cooperating arm 111 is provided on the outer shell 62 of the housing for the universal joint 20, all as best illustrated in Figure 1.

Figure 7:
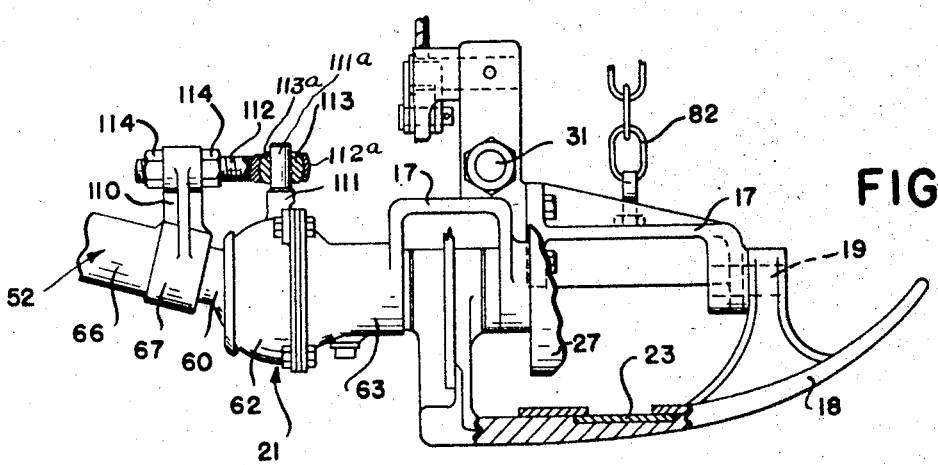
Figure 7 is an enlarged fragmentary view of a portion of Figure 1.
Figure 8:
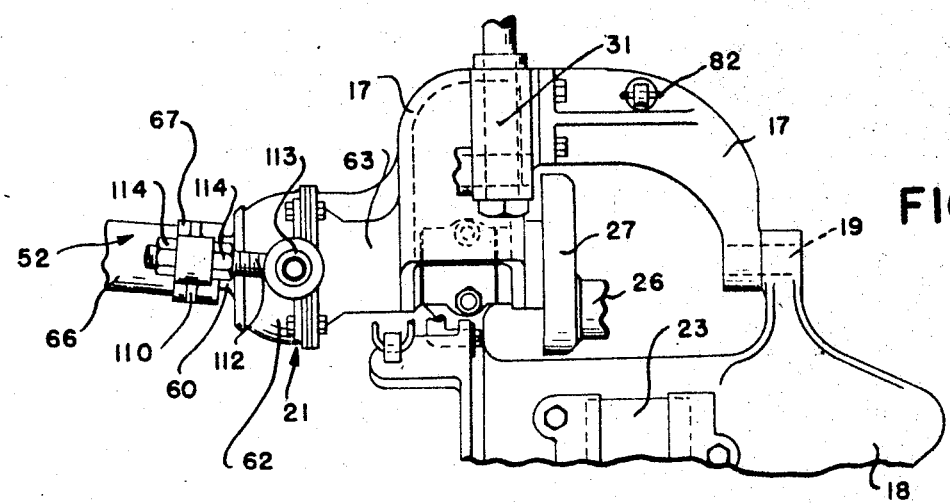
Figure 8 is an enlarged fragmentary view of a portion of Figure 2.

An adjustable link 112 interconnects the arms 110 and 111, having for this purpose a universal connection indicated at 113. As shown in Figure 7, this universal connection 113 comprises a spherical element 113ª sleeved on a cylindrical shank 111ª of the arm 111 and slidably engaged by the spherical walls of a socket 112ª in the link 112. I have illustrated the adjustment as being provided by a pair of lock nuts 114 which threadedly engage the link 112 upon opposite sides of the arm 110. As will be evident from this figure, adjustment of the nuts 114 provides an angular adjustment between housing 52 and the support 17. This has the effect of swinging the support 17 about the connection 31 so that the mower arm 22 will be tilted relative to the ground to vary the height of cut made by the sickle bar 23 of the mower assembly. For example, when nuts 114 are adjusted in a manner to swing the free ends of arms 110 and 111 toward each other, the angle between housing 52 and shell 62 is changed correspondingly. Such angular action between the parts mentioned causes support 17 to rock about the connection 31, while housing 52 swings about the center of universal joint 37. The consequent elongation of the torque transmitting assembly 52 between universal joints 20 and 37 is permitted by reason of the splined connection between the shafts 43 and 46. Therefore, when arms 110 and 111 are adjusted toward each other as aforesaid, the support 17 is adjusted about the connection 31.

Figure 9:
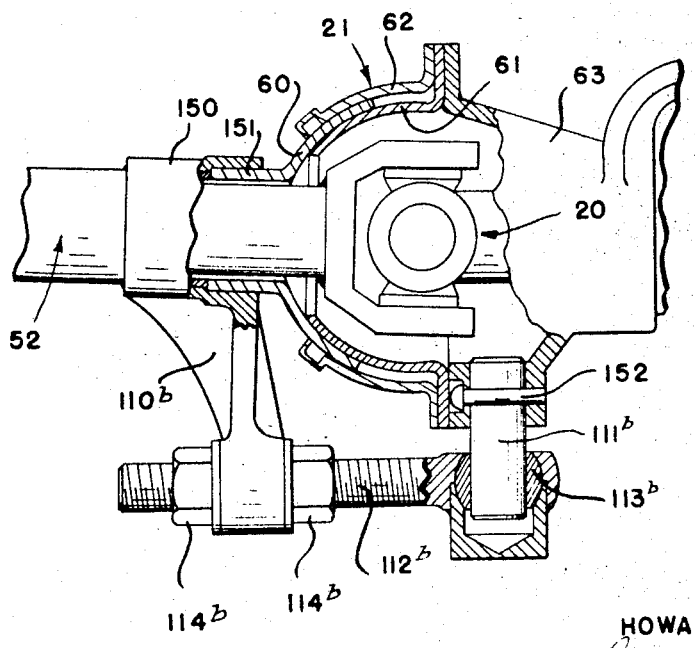
Figure 9 is an elevational view, partly in section, of a modification of my invention.

In Figure 9 I have illustrated a slight modification wherein arms 110b and 111b are located on the undersides of the housings 52 and 21. As shown, the arm 110b is a depending integral part of a collar 150 that is sleeved upon and rigid with the housing 52 and an annular portion 151 of the shell 60, while the arm 111b is secured by a pin 152 in the housing 63 which forms a part of the universal joint housing 21. An adjustable link 112b interconnects the arms 110b and 111b and has a universal connection 113b. Lock nuts 114b are provided on the link 112b at opposite sides of the arm 110b, and the operation of the parts is the same as that mentioned in connection with the adjustment illustrated in Figures 6 and 7.

What I claim as my invention is:

1. In a mowing machine, a tractor having a power take-off shaft, a sickle bar at one side of the tractor, a driving connection between the power take-off shaft and sickle bar including a propeller shaft, a crank shaft, and a universal joint between said propeller shaft and crank shaft, relatively movable housings for said propeller shaft and universal joint, a housing for the crank shaft, a support for the sickle bar rigid with the crank shaft housing and mounted to turn about a transverse horizontal axis relative to the tractor, and means for adjusting the support about such transverse horizontal axis to tilt the sickle bar relative to the ground, including an adjustable connection between the relatively movable housings aforesaid.

2. In a mowing machine, a tractor having a power take-off shaft, a sickle bar at one side of the tractor, a driving connection between the power take-off shaft and sickle bar including a propeller shaft, a crank shaft, and a universal joint between said propeller shaft and crank shaft, relatively movable housings for said propeller shaft and universal joint, a housing for the crank shaft, a support for the sickle bar rigid with the crank shaft housing and mounted to turn about a transverse horizontal axis relative to the tractor, and means for adjusting the support about such transverse horizontal axis to tilt the sickle bar relative to the ground, including arms rigid with said relatively movable housings, and an adjustable connection between said arms.

3. In a mowing machine, a tractor having a power take-off shaft, a sickle bar at one side of the tractor, a driving connection between the power take-off shaft and sickle bar including a propeller shaft, a crank shaft, and a universal joint between said propeller shaft and crank shaft, relatively movable housings for said propeller shaft and universal joint, a housing for the crank shaft, a support for the sickle bar rigid with the crank shaft housing and mounted to turn about a transverse horizontal axis relative to the tractor, and means for adjusting the support about such transverse horizontal axis to tilt the sickle bar relative to the ground, including arms carried by said relatively movable housings, and an adjustable link interconnecting said arms.

4. In a mowing machine, a tractor having a power take-off shaft, a sickle bar at one side of the tractor, a driving connection between the power take-off shaft and sickle bar including a propeller shaft, a crank shaft, and a universal joint between said propeller shaft and crank shaft, relatively movable housings for said propeller shaft and universal joint, a housing for the crank shaft, a support for the sickle bar rigid with the crank shaft housing and mounted to turn about a transverse horizontal axis relative to the tractor, and means for adjusting the support about such transverse horizontal axis to tilt the sickle bar relative to the ground, including an arm fixed to the propeller housing, and an adjustable connection between said arm and the universal joint housing including an element mounted for universal movement relative to said universal joint housing.

5. In a tractor-mower, a mower arm support mounted for adjustment about a transverse axis, a crank on said support for driving a sickle bar, a drive shaft, a universal joint connecting said crank and drive shaft, an enclosure for said shaft, an enclosure for said universal joint rigid with said mower arm support, and means mounted in part on said shaft enclosure and in part on said universal joint enclosure for adjusting the angularity of said support.

6. In a tractor-mower, a mower arm support mounted for adjustment about a transverse axis, a crank on said support for driving a sickle bar, a drive shaft and a universal joint connecting said crank and drive shaft, an enclosure for said joint rigid with said support, an enclosure for said shaft, an arm on said universal joint enclosure, an arm on said shaft enclosure, and adjustable means connecting said arms for varying the angularity of said universal joint enclosure and the associated support relative to the said shaft enclosure.

7. In a mowing machine, a mower shoe, a support for said shoe, a pivotal mounting for said support, a cutter bar carried by said shoe, drive means for the cutter bar including a pair of universally connected shafts, universally connected housings for said shafts, one being rigid with the support, and means carried by said universally connected housings for tilting the support, mower shoe and cutter bar as a unit about said pivotal mounting.

8. In a mowing machine, a mower shoe, a support for said shoe, a pivotal mounting for said support, a cutter bar carried by said shoe, drive means for the cutter bar including a pair of universally connected shafts, universally connected housings for said shafts, one being rigid with the support, and means for tilting the mower shoe, support and cutter bar as a unit about said pivotal mounting, including arms rigid with said housings, and an adjustable link extending between said arms.

9. In a mowing machine, a mower shoe, a support for said shoe, a pivotal mounting for said support, a cutter bar carried by said shoe, drive means for the cutter bar including a pair of universally connected shafts, universally connected housings for said shafts, one being rigid with the support, and means for tilting the mower shoe, support and cutter bar as a unit about said pivotal mounting, including arms rigid with said housings, and a link universally connected to one of said arms and adjustably connected to the other of said arms.

10. In a mowing machine, a ground-engaging mower shoe, a cutter bar carried by said shoe, drive means for the cutter bar including a pair of universally connected shafts, supporting means for the shoe including universally connected housings for said shafts, and means carried by said universally connected housings for tilting the shoe and cutter bar as a unit relative to the ground.

11. In a mowing machine, a ground-engaging mower shoe, a cutter bar carried by said shoe, drive means for the cutter bar including a pair of universally connected shafts, supporting means for the shoe including universally connected housings for said shafts, and means for tilting the shoe and cutter bar as a unit relative to the ground including arms rigid with said housings, one to each housing, and an adjustable link extending between said arms.

12. In a mowing machine, a ground-engaging mower shoe, a cutter bar carried by said shoe, drive means for the cutter bar including a pair of universally connected shafts, supporting means for the shoe including universally connected housings for said shafts, and means for tilting the shoe and cutter bar as a unit relative to the ground including arms rigid with said housings, one to each housing, and a link universally connected to one of said arms and adjustably connected to the other of said arms.

13. In a mowing machine, a tractor, a mower assembly adjacent the tractor and including a cutter bar, means for driving the cutter bar from the tractor including a pair of universally connected shafts, and a mounting for the mower assembly including a supporting rod extending laterally from the tractor, a pair of universally connected housings for the shafts aforesaid, one of said housings being connected to said mower assembly and tiltable on said rod, and means for tilting the tiltable housing on said rod including adjustable means extending between and connected to said universally connected housings.

14. In a mowing machine, a tractor, a mower assembly adjacent the tractor and including a cutter bar, means for driving the cutter bar from the tractor including a pair of universally connected shafts, and a mounting for the mower assembly including a supporting rod extending laterally from the tractor, a pair of universally connected housings for the shafts aforesaid, one of said housings being connected to said mower assembly and tiltable on said rod, and means for tilting the tiltable housing on said rod including substantially parallel arms projecting from said universally connected housings, one from each of said housings, and an adjustable link interconnecting said arms.

15. In a mowing machine, a tractor, a mower assembly adjacent the tractor and including a cutter bar, means for driving the cutter bar from the tractor including a pair of universally connected shafts, and a mounting for the mower assembly including a supporting rod extending laterally from the tractor, a pair of universally connected housings for the shafts aforesaid, one of said housings being connected to said mower assembly and tiltable on said rod, and means for tilting the tiltable housing on said rod including substantially parallel arms projecting from said universally connected housings, one from each of said housings, a spherical member on one of said arms, and a link universally mounted on said spherical member and adjustably connected to the other of said arms.

16. In a mowing machine, a tractor, a mower assembly adjacent the tractor and including a cutter bar, means for driving the cutter bar from the tractor including a pair of universally connected shafts, and a mounting for the mower assembly including a supporting rod projecting from the tractor, a pair of universally connected housings for said shafts, one of said housings being connected to said mower assembly and tiltable on said rod, arms projecting laterally from said housings, one from each housing, and an adjustable connection between said arms operable to cause the tiltable housing and mower assembly connected thereto to tilt about said rod.

17. In a mowing machine, a tractor, a mower assembly adjacent the tractor and including a cutter bar, a supporting rod extending laterally from the tractor, a support for the mower assembly mounted to tilt on said rod, means for driving the cutter bar from the tractor including a pair of shafts having a universal joint therebetween, a housing for said universal joint rigid with said support and including cooperating spherical shells, and an adjustable connection between said shells operable to tilt the support on said rod.

18. In a mowing machine, a tractor, a mower assembly adjacent the tractor and including a cutter bar, a supporting rod extending laterally from the tractor, a support for the mower assembly mounted to tilt on said rod, means for driving the cutter bar from the tractor including a pair of shafts having a universal joint therebetween, a housing for said universal joint rigid with said support and including cooperating spherical shells, and means for tilting the support on said rod, including arms rigid with said shells, one with each shell, and an adjustable link extending between and connected to said arms.

19. In a mowing machine, a tractor, a mower assembly adjacent the tractor and including a cutter bar, a supporting rod extending laterally from the tractor, a support for the mower assembly mounted to tilt on said rod, means for driving the cutter bar from the tractor including a pair of shafts having a universal joint therebetween, a housing for said universal joint rigid with said support and including cooperating spherical shells, and means for tilting the support on said rod including arms rigid with said shells, one with each shell, and a link universally connected to one of said arms and adjustably connected to the other of said arms.

HOWARD W. SIMPSON.